United States Patent
Fukuhara et al.

(10) Patent No.: US 6,659,704 B2
(45) Date of Patent: Dec. 9, 2003

(54) LOADING BRIDGE FOR AIR CARGO LOADING

(75) Inventors: Yugo Fukuhara, Minato-ku (JP); Toru Takasu, Minato-ku (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/132,728

(22) Filed: Apr. 26, 2002

(65) Prior Publication Data
US 2002/0164236 A1 Nov. 7, 2002

(30) Foreign Application Priority Data
Apr. 27, 2001 (JP) ........................................ 2001-132898

(51) Int. Cl.$^7$ .............................. B64F 1/305; B64F 1/32
(52) U.S. Cl. ........................ 414/398; 414/393; 414/502; 414/503; 244/137.1; 14/71.5; 198/457.07
(58) Field of Search ................................. 414/502, 503, 414/398, 393; 244/137.1; 14/71.5; 198/457.07

(56) References Cited

U.S. PATENT DOCUMENTS

| | | | |
|---|---|---|---|
| 2,826,319 A | * 3/1958 | Renner et al. | 414/564 |
| 3,730,359 A | * 5/1973 | Anderson | 244/137 R |
| 3,916,588 A | * 11/1975 | Magill | 52/30 |
| 4,218,034 A | * 8/1980 | Magill | 244/114 R |

FOREIGN PATENT DOCUMENTS

WO 00/55040 * 9/2000

* cited by examiner

Primary Examiner—Steven A. Bratlie
(74) Attorney, Agent, or Firm—Armstrong, Westerman & Hattori, LLP

(57) ABSTRACT

In the conventional air cargo transportation system, the transportation of the cargo that is stored inside of the airport terminal building, to the area of the loading/unloading door is normally performed using the package/cargo carts. However, numerous workers were needed to load the cargo and drive the carts, which is very labor intensive and entails high manpower costs. The conventional system is also dangerous as they move along the complex tarmac markings. To solve these problems, this invention discloses a loading bridge which employs a cargo conveyor line comprising a transport means such as a conveyer, which can be extended or retracted, that connects with a rotunda extending from the airport terminal building; a cargo conveyor junction having a means to change the direction of the cargo conveyance by rotating the conveyor surface or changing its angle to alter the direction of the cargo conveyance to match the next conveyor line; and another cargo conveyor line to reach the cargo loading/unloading door of the aircraft, to thereby enable the automated conveyance of cargo for the aircraft from the airport terminal cargo holding area to the cargo door of the aircraft to eliminate the possibility of equipment collisions, to reduce manpower costs, and to shorten the time required for loading the aircraft.

6 Claims, 8 Drawing Sheets

LOADING BRIDGE FOR AIR CARGO LOADING

BACKGROUND OF THE INVENTION

1. Field of the Invention

The present invention relates to a loading bridge for air cargo loading which conveys the cargo into the aircraft.

2. Description of the Related Art

Due to considerations such as the need to convey cargo into an aircraft in a short period of time, and the requirement to consider the balance of the aircraft when loading, as affected by the location of passengers, the weight of the cargo itself, etc., aircraft are normally equipped with multiple doors for loading cargo, for example, as shown in FIG. 9, the main door 90 in the center of the fuselage, the bulk door 91 in the rear of the fuselage, the lower door 92 in the front of the fuselage, and the nose door 93 at the front point of the fuselage. The transportation of the cargo stored inside of the airport terminal building to the area of the loading door is normally performed using a ramp equipment tractor 94 to package/cargo carts 95, lower deck container dollies 96, pallet dollies 97, etc. Further, this cargo is raised up to the loading door of the aircraft by such means as container/pallet loaders 98, self-propelled conveyor belt loaders 99, etc.

However, the required operations, such as loading the cargo onto the package/cargo carts 95, the lower deck conveyor dollies 96, the pallet dollies 97, etc; connecting these to the ramp equipment tractor 94; driving the ramp equipment tractor 94; transferring the cargo to the container/pallet loaders 98, the self-propelled conveyor belt loaders 99; operating the container/pallet loaders 98 and self propelled conveyor belt loaders 99; moving the cargo into a specific place in the aircraft; all of these operations involve operating multiple types of equipments and employing numerous workers to move and convey the freight, which are very labor intensive and entails high manpower costs. This system is also dangerous due to the possibility of accidents, such as collisions of the ramp equipment tractors as they move along the complex tarmac markings.

SUMMARY OF THE INVENTION

In view of the above described situation, the objective of the present invention is to provide an air cargo handling system that eliminates the multiple types of equipment and numerous workers required for cargo handling, to lower manpower costs and cargo loading time, and to reduce danger by avoiding accidents and the like.

To achieve the foregoing objective, the loading bridge according to the present invention, employs a cargo conveyor line comprising a transport means such as a conveyor, which can be extended or retracted, that connects with a rotunda extending from the airport terminal building; a cargo conveyor junction having a means to change the direction of the cargo conveyance by rotating the conveyor surface or changing its angle to alter the direction of the cargo conveyance to match the next conveyor line; and another cargo conveyor line to reach the cargo loading door of the aircraft, to thereby enable the automated conveyance of cargo for the aircraft from the airport terminal cargo holding area to the cargo door of the aircraft without the use of human-driven equipment such as ramp equipment tractors, to eliminate the possibility of equipment collisions, to reduce manpower costs, and to shorten the time required for loading the aircraft.

Accordingly, the present invention is related to a loading bridge for conveying air cargo, that connects the airport terminal with the cargo door of the aircraft, and the loading bridge is distinguished by a configuration comprising a plurality of cargo conveyor lines, and at least one of which is extendable and retractable; and a cargo conveyor junction that joins the foregoing plurality of cargo conveyor lines, which, by rotating the conveying surface or by changing the angle of the surface, can divert the cargo riding on the cargo conveyor line from one cargo conveyor line to the designated cargo conveyor line, wherein one end of the loading bridge connects to the airport terminal and the other end reaches the cargo loading door of the aircraft to thereby enable the cargo to be transported from the airport terminal to the cargo door of the aircraft.

Since the cargo holding area of the airport terminal connects to the aircraft via a plurality of cargo conveyor lines connected by a cargo conveyor junction that can change the direction of the cargo being transported, the need for human driven ramp equipment tractors or other equipment used in the prior arts may be eliminated. Thus not only does this invention prevent the possibility of accidents such as collisions, but it also reduces manpower costs, and shortens the time required to load cargo onto an aircraft.

The cargo conveyor junction can be preferably configured by a transport unit (surface) having a cargo transport conveyor belt which is rotatable, and a control mechanism which can rotate the transport unit (surface) and stop it at the point in which the conveying direction of the transport unit matches the designated direction of the cargo conveyance.

The cargo conveyor junction mentioned above preferably can be round shaped, and configured by a carousel having a number of cargo loading plates which run around the circles. The carousel receives cargo from the cargo conveyor line and places the cargo on the loading plates turning around, and forwards the cargo to a next cargo conveyor line.

By configuring the cargo conveyor junction as above, whenever the cargo conveying line is bent at the cargo conveyor junction in any direction, the cargo on the cargo conveyor line can be forwarded to the designated bent cargo conveyor line flexibly. This arrangement enables the transport of the cargo from the cargo holding area of the airport terminal to the cargo loading door of the aircraft without any manpower. It will result in, as mentioned above, eliminating the need for human driven ramp equipment tractors or other equipment used in the prior arts. Thus not only does this invention prevent the possibility of accidents such as collisions, but it also reduces manpower costs, and shortens the time required to load cargo.

More precisely, the extendable/retractable cargo conveyor line may be configured by a central conveyor unit comprising a transport conveyor, and end conveyor units which are slidably joined to the central conveyor at each of its ends, and include a mechanism that maintains an approximately flat transport surface for the cargo between the end conveyor units and central conveyor unit.

The extendable/retractable cargo conveyor line configured in this manner is capable of connecting the cargo hold inside the airport terminal building with a cargo loading door by means of this loading bridge irrespective of the position where the aircraft is parked, to make it possible to convey the cargo without human intervention.

DETAILED DESCRIPTION OF THE PREFERRED EMBODIMENTS

In the following section we shall give a detailed explanation of the invention with reference to the drawings. Insofar as the size, material and shape of the components and the relative position of the components, or other features disclosed in these embodiments, they are not intended to limit the scope of the invention, but serve merely as examples to clarify the invention unless otherwise there is a specific disclosure.

Figure 1:
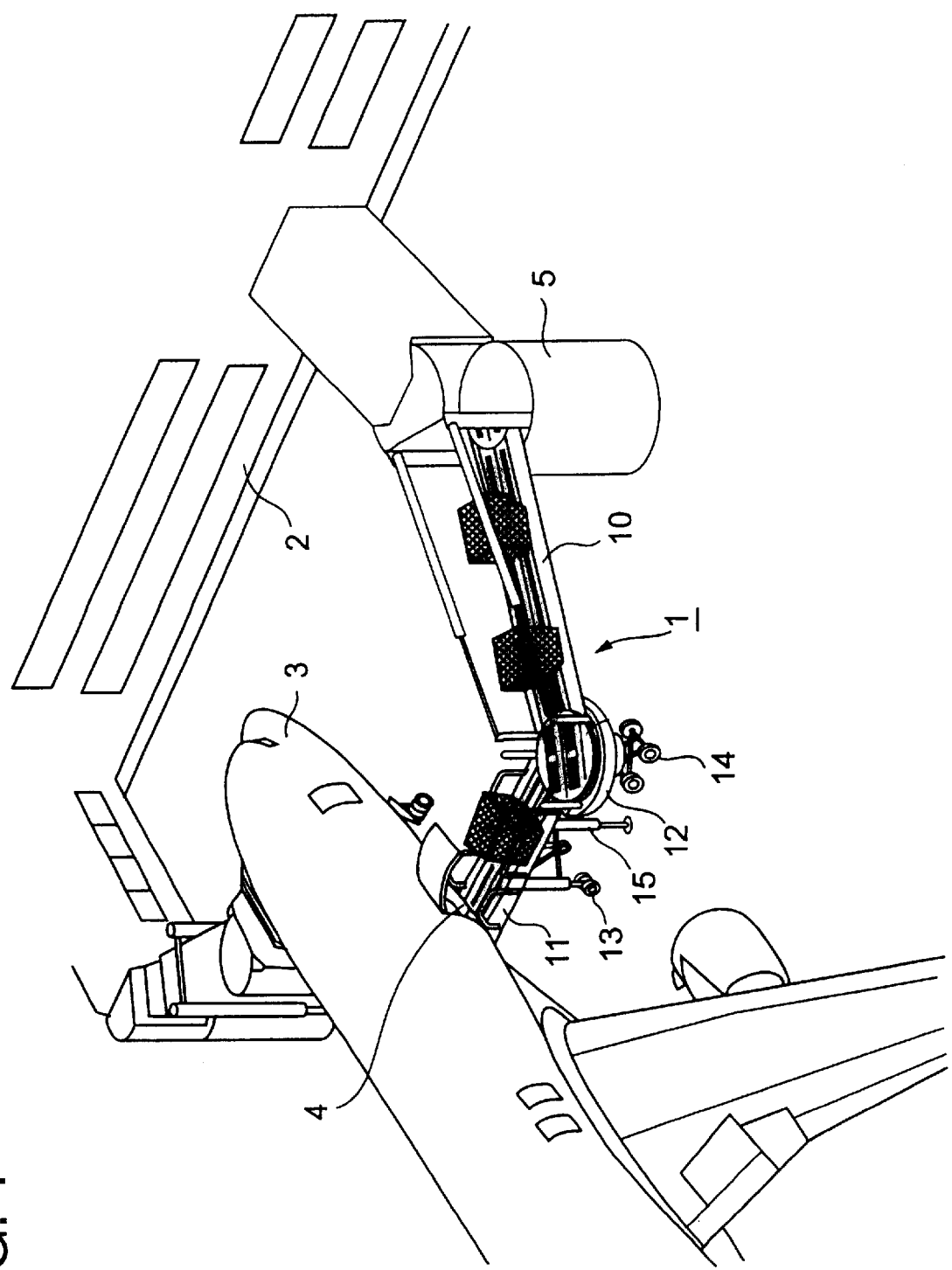
FIG. 1 shows a perspective diagram showing an embodiment of the present invention.
Figure 2:
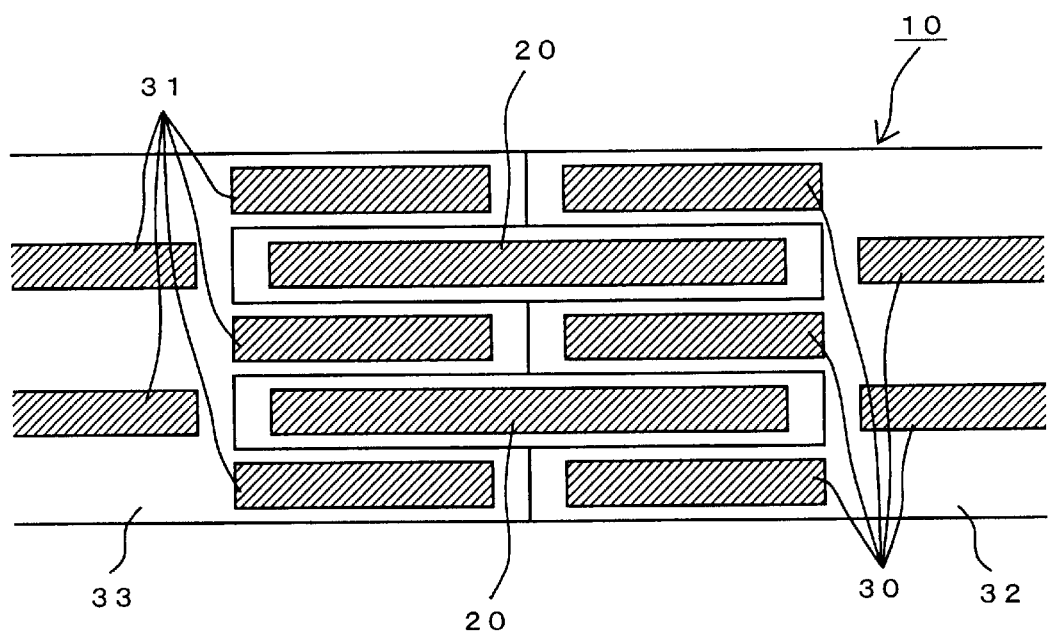
FIG. 2 shows a top view of the extension and retraction mechanism of the loading bridge according to a preferred embodiment of this invention.
Figure 3:
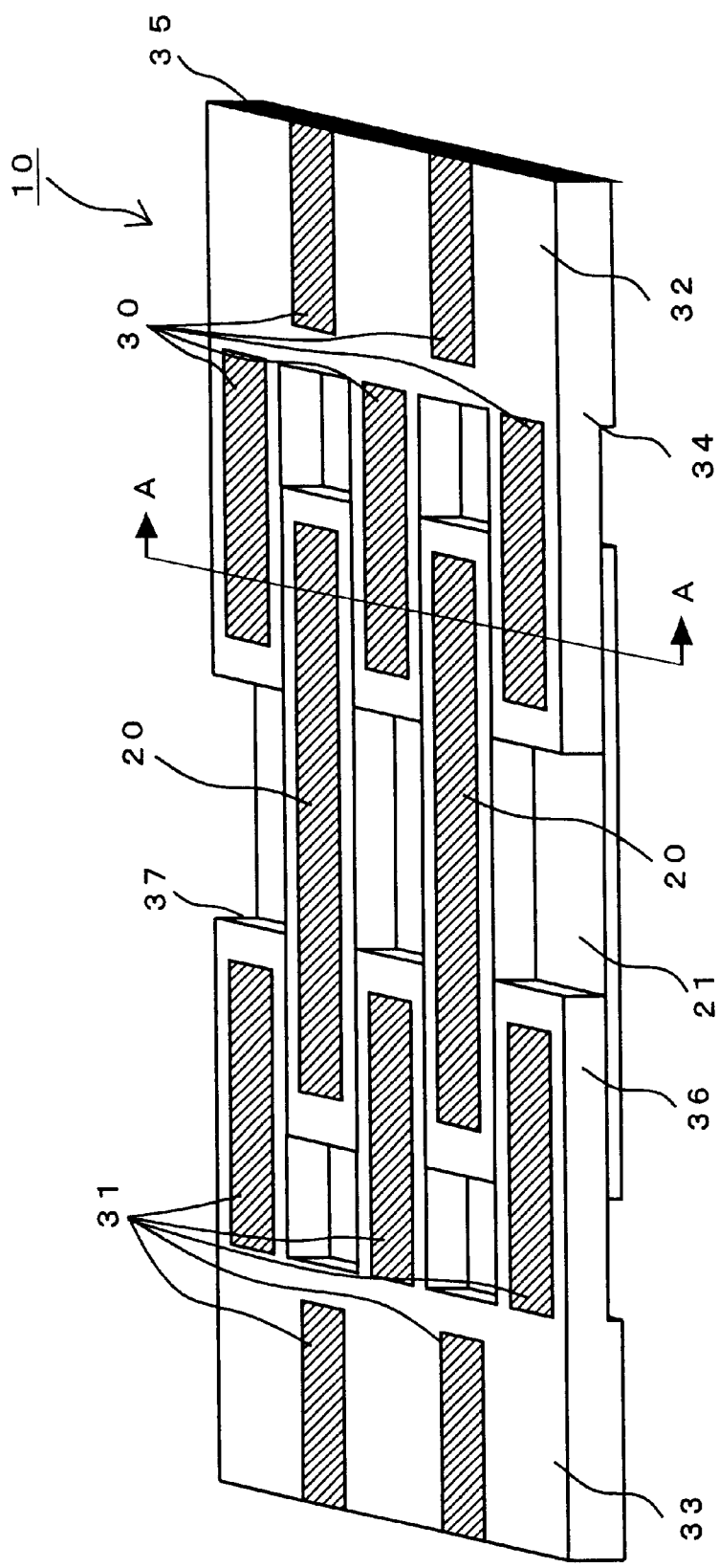
FIG. 3 shows a perspective view of the extension and retraction mechanism of the loading bridge according to a preferred embodiment of this invention.
Figure 4:
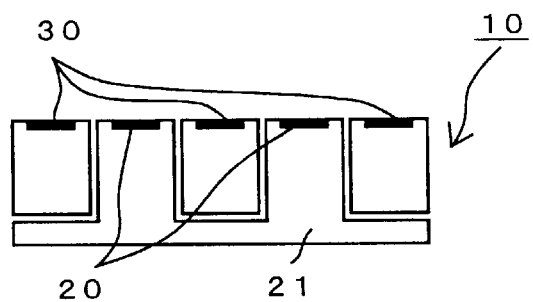
FIG. 4 shows a cross sectional view of the extension and retraction mechanism of the loading bridge according to a preferred embodiment of this invention.
Figure 5:
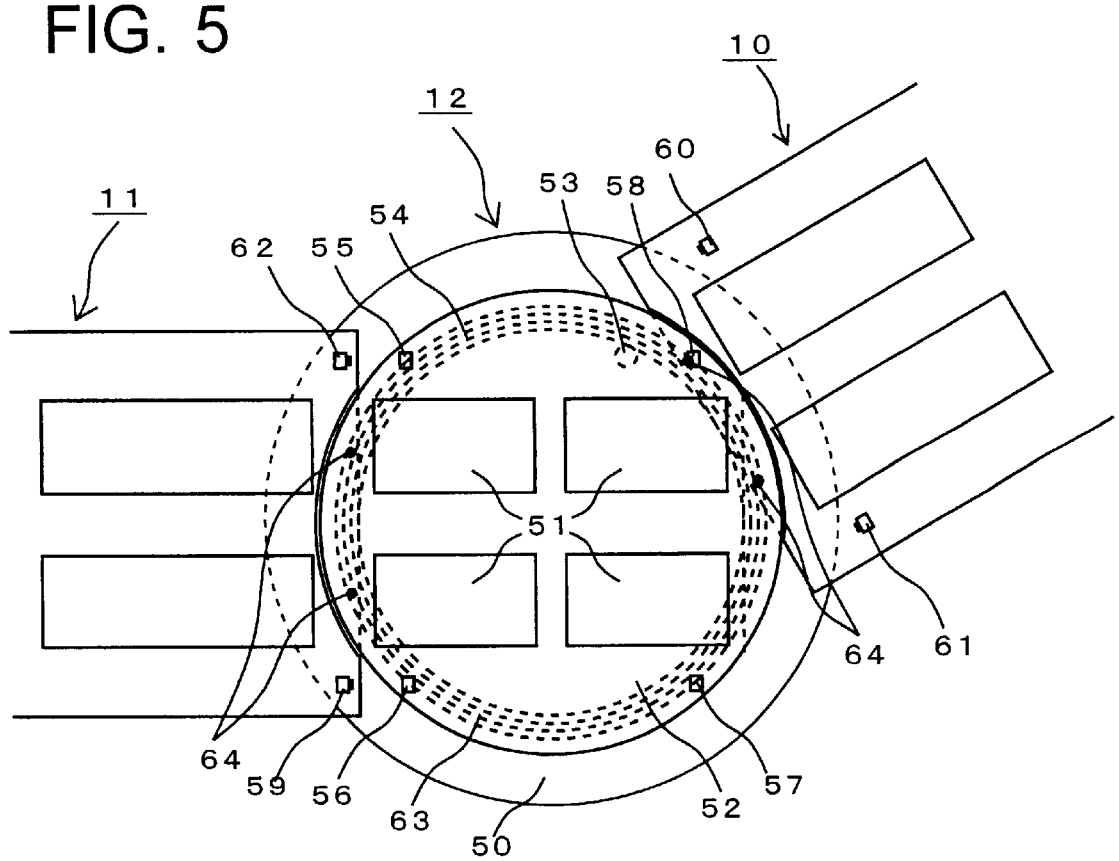
FIG. 5 shows the mechanism for changing the direction of travel of the cargo according to this invention.
Figure 6:
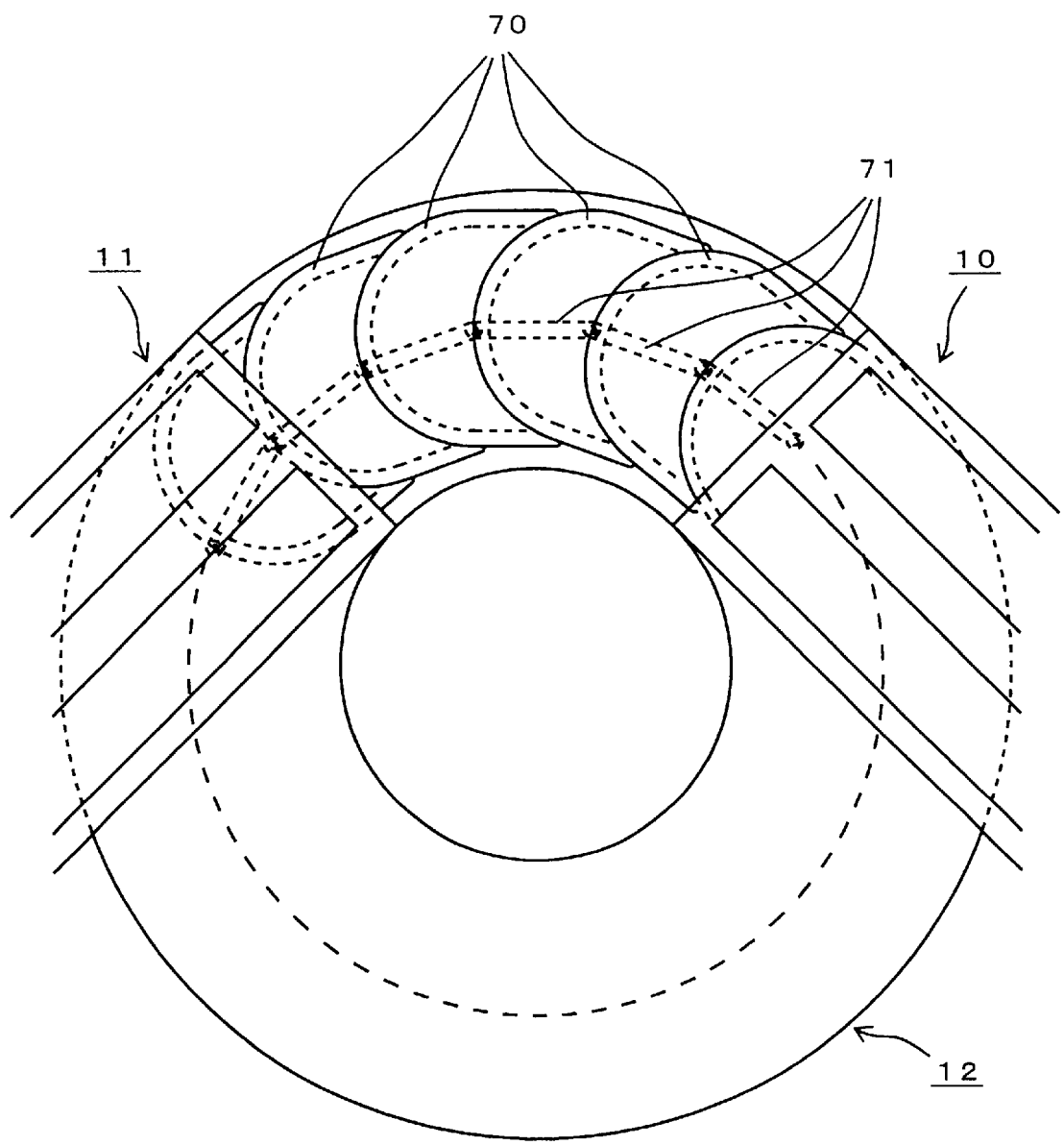
FIG. 6 shows an explanatory view of the mechanism for changing the direction of travel of the cargo according to another preferred embodiment of this invention.
Figure 7:
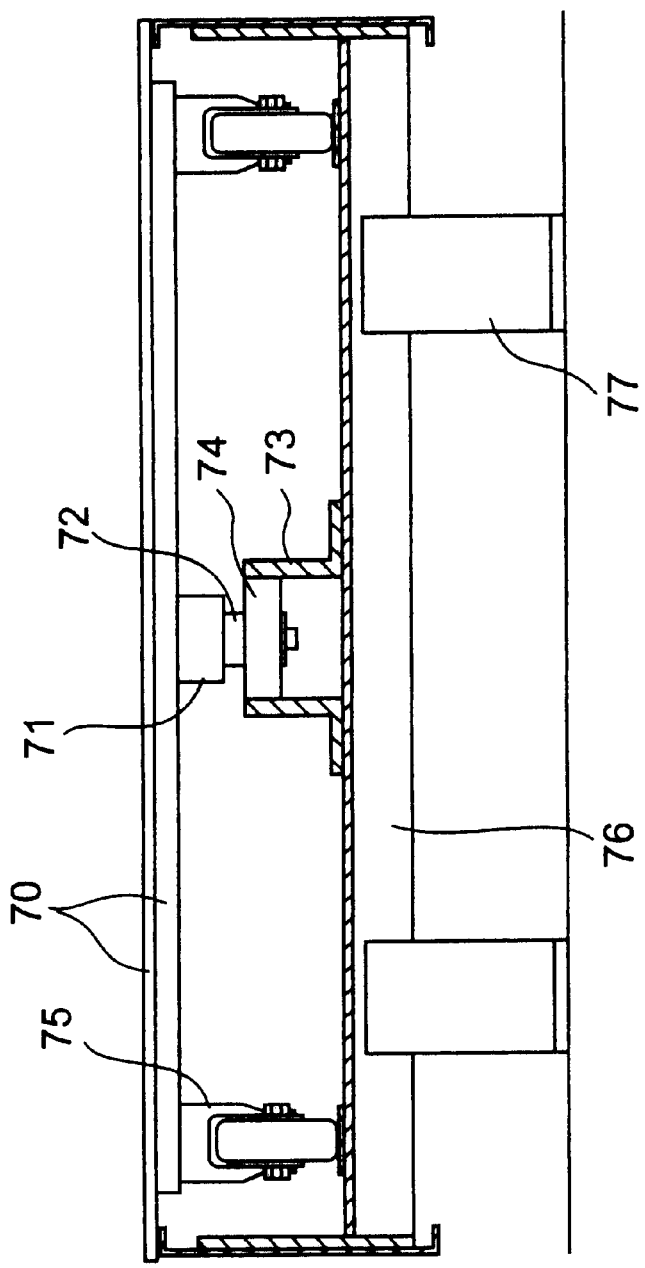
FIG. 7 shows an explanatory view of the mechanism for changing the direction of travel of the cargo according to a further preferred embodiment of this invention.
Figure 8:
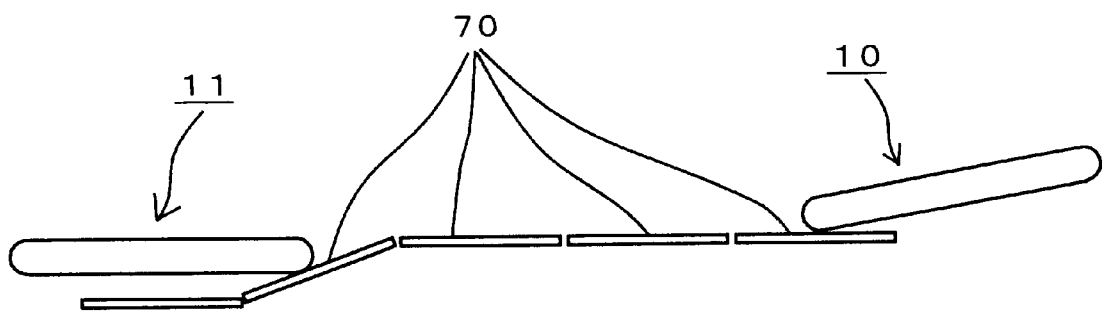
FIG. 8 shows an explanatory view of the mechanism for changing the direction of travel of the cargo according to yet another preferred embodiment of this invention.
Figure 9:
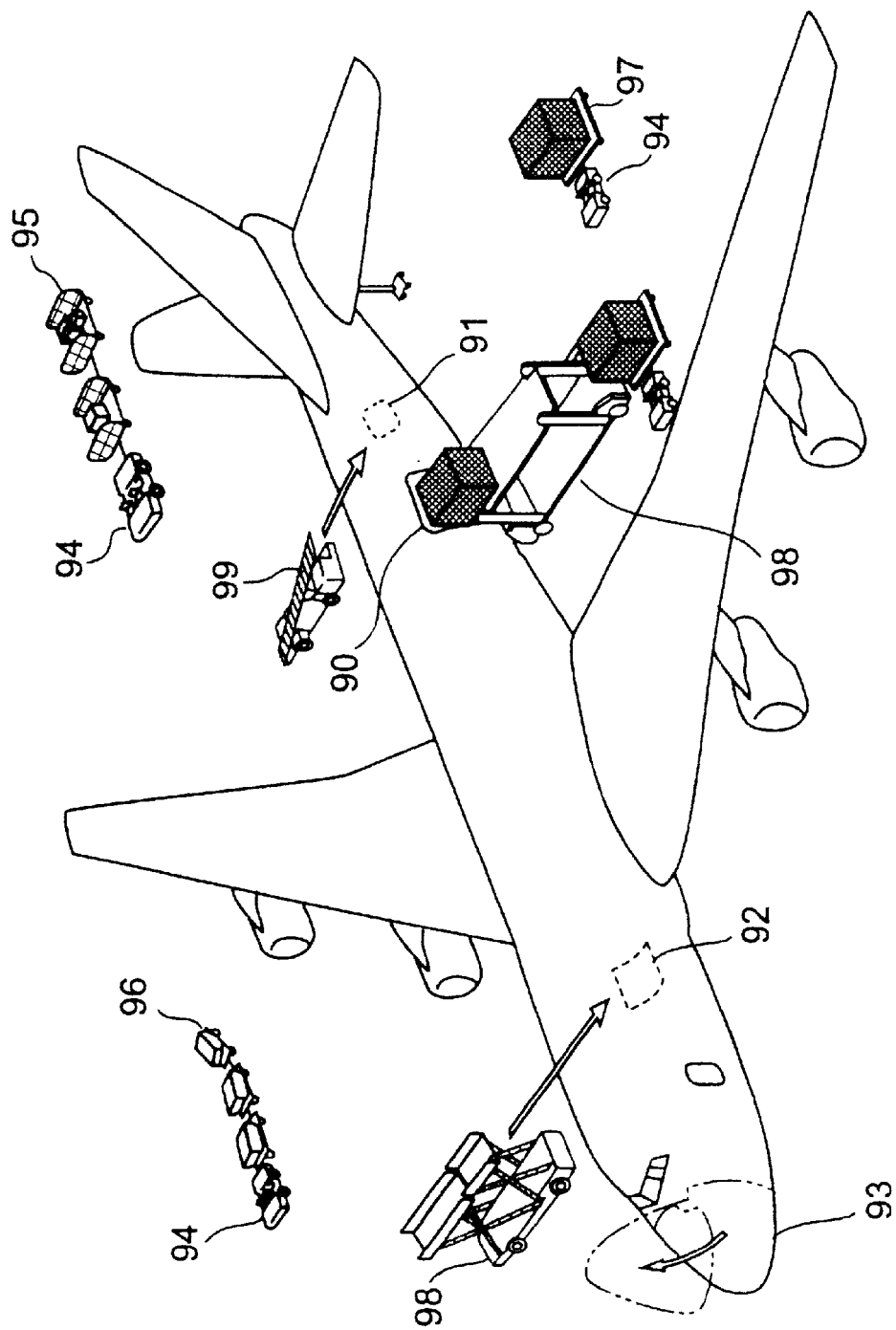
FIG. 9 shows the conventional cargo handing system in an airport according to the prior arts.

FIG. 1 shows a perspective diagram showing an embodiment of the present invention; FIGS. 2, 3 and 4 will be used to explain the extension and retraction mechanism of the loading bridge; FIG. 5 will be used to explain the mechanism for changing the direction of travel of the cargo; and FIGS. 6, 7 and 8 show other embodiments of mechanisms for changing the direction of travel of the cargo.

In the drawings, 1 is loading bridge, 2 is airport terminal building, 3 is aircraft, 4 is cargo loading/unloading door of aircraft 3, 5 is rotunda extending from the airport terminal building 2 to connect with airport terminal building 2 and cargo conveyor line 10, 10 is an extendable/retractable cargo conveyor line, 11 is a cargo conveyor line to connect to cargo loading/unloading door 4 of aircraft 3, 12 is a cargo conveyor junction which has a mechanism to rotate or change the angle of conveyor base 50 on the cargo conveyor line for switching the travel direction of the cargo from the cargo conveyor line 10 to the designated cargo conveyor line 11, 13 and 14 are casters to move cargo conveyor line 11 and cargo conveyor junction 12, and 15 is a position fixing device to fix cargo conveyor line 11.

As shown in FIG. 1, the present invention is a loading bridge 1 that connects the cargo holding area inside airport terminal building 2 with the cargo loading/unloading door 4 of the aircraft 3 for the transport of air cargo. The loading bridge 1 comprises, an extendable/retractable cargo conveyor line 10 connected to a rotunda 5 extending from the airport terminal building 2; a cargo conveyor line 11 that connects to the cargo loading/unloading door 4 of the aircraft 3; and a cargo conveyor junction 12 which has a switching means for switching the travel direction of the cargo from the cargo conveyor line 10 to the designated cargo conveyor line 11. Among these units, the cargo conveyor junction 12, and the cargo conveyor line 11 are equipped with casters 13, 14 to enable the loading bridge 1 to be connected to the aircraft 3 depending on where the aircraft is parked, and in addition, the cargo conveyor line 11 has a position fixing device 15, along with caster 13 which includes a mechanism to adjust the height of the cargo conveyor line 11 to that of the cargo loading/unloading door 4. Further, a belt conveyor or the like connects the cargo holding area inside the airport terminal building 2 with the rotunda 5. Inside of the rotunda 5, a means for changing the direction of cargo conveyance is provided, which is the same as the cargo conveyor junction 12.

The extendable/retractable cargo conveyor line 10, as shown in a top view in FIG. 2, a perspective view in FIG. 3, and in a sectional view along line A—A of FIG. 3 in FIG. 4, is comprised of a central conveyor unit 21 having a transport conveyor 20, and right side conveyor unit 32 and left side conveyor unit 33. These right side conveyor unit 32 and left side conveyor unit 33 are composed of transport conveyors 30, 31 that are slidably attached to the central conveyor 21 respectively. One end of the cargo conveyor line 10 is affixed to the rotunda 5 which extends from the airport terminal building 2, and the other end is affixed to cargo conveyor junction 12. Further, the central conveyor 21, the right side conveyor unit 32 and the left side conveyor unit 33 have a slidable mechanism which keeps each conveyor surface almost flat. This mechanism, for example, may consist of shafts, one of which passes from the side wall 34 of the right side conveyor unit 32 to the opposite side wall 35, and the other of which passes from the side wall 36 of the left side conveyor 33 to the opposite side wall 37, and both of which also pass through the center conveyor unit 21. The shafts, supported by the central conveyor, are held in elongated holes to make them slidable. Another method would be to have rail like supports that pass through the central conveyor unit 21 from both the right and left side to the center shown in FIG. 3, which support the right side conveyor unit 32 and the left side conveyor unit 33, and these allow the central conveyor unit 21 to slide.

Further, FIG. 5 shows a top view of an embodiment of the cargo conveyor junction 12, which is the means of changing the conveyance direction of cargo being conveyed from one cargo conveyor line 10 to the next cargo conveyor line 11. Atop the base 50 is a rotatably structured conveyor unit 52 having conveyor belts 51. The rotation for the conveyor unit 52 is performed by a motor (not shown) that applies motive force to the pinion 53 and rack 54 apparatus. The movement of the cargo, the stopping and starting of the conveyance, and the detection of the stop position for the rotation of the conveyor unit 52 are performed by optical sensors 55, 57 and light emitting elements 56, 58, such as light emitting diodes, which provide the light for detection by optical sensors 55. Further, a guide groove 63 and guide pin 64 are provided to guide the rotation of the conveyor unit 52. Further, light emitting elements 61, 62, such as light emitting diodes, are installed on the cargo conveyor lines 10, 11 to allow the optical sensors 59, 60 to stop the conveyor unit 52 directed towards the cargo conveyor line 10 or 11, to correspond with the light received from the light emitting elements 56, 58.

Thus the above described loading bridge 1 of this invention can, when an aircraft 3 stops in the parking area as shown in FIG. 1, extend or retract the extendable/retractable cargo conveyor line 10 as described in FIGS. 2 through 4, to reach the cargo conveyor line 11 to the cargo loading/unloading door 4 of the aircraft 3 and be fixed in place by position fixing device 15. Then, to load the aircraft 3, the cargo accumulated in the cargo holding area inside of the airport terminal building 2 is transported by conveyor belts via rotunda 5, and loaded into the aircraft over the loading bridge to transport the air cargo with a constant space between each item.

When conveying the air freight on the cargo conveyor line 10 of the loading bridge 1 for conveying the air cargo, when optical sensor 60 detects the cut-off of the light from light emitting element 61 in front of cargo conveyor junction 12, as shown in FIG. 5, if the conveyor belts 51 of the conveyor unit 52 are not directed towards the direction of transport, first the cargo conveyor 10 and the conveyor belt running from the cargo holding area are temporarily stopped, and then, a motor (not shown) applies motive force to pinion 53 and rack 54 apparatus to cause the conveyor unit 52 to rotate. Then, when detection is made of the input of light from the light emitting element 58 into the optical sensor 60, the rotation of the conveyor unit 52 is halted at the point where the conveyor belts 51 of the conveyor unit 52 are in line with the cargo conveyor line 10.

As a result, the temporary stoppage of the cargo conveyor line 10 and the conveyor belt from the cargo holding area is released, and the cargo is transported atop of the conveyor belts 51 of the conveyor unit 52. Then, when the optical sensor 55 detects the cargo blocking the light from the light emitting element 56, the conveyor belts 51 are temporarily stopped, while a motor (not shown) transmits motive force to the pinion 53 and rack 54 apparatus to cause the conveyor unit 52 to rotate. Then, when the optical sensor 59 detects the input of light from the light emitting element 56, as shown in FIG. 5, since the conveyor belts 51 on the conveyor unit 52 are now in line with the cargo conveyor line 11, the rotation is halted and the temporary stoppage of the conveyor belts 51 is released to allow the cargo to be sent onto the cargo conveyor line 11.

Then when, as the cargo advances towards the cargo loading/unloading door 4 of the aircraft 3, the optical sensor 59 detects the light from the light emitting element 62 (i.e., the cargo has been completely transferred to the cargo conveyor line 11), the drive force from a motor (not shown) is transmitted to the pinion 53 and rack 54 apparatus to cause the conveyor unit 52 to rotate, and then when the optical sensor 60 detects light from the light emitting element 58, that rotation is halted at the point where the conveyor belts 51 are directed towards the cargo conveyor line 10 in preparation to change the conveyance direction for the next piece of cargo. On the other hand, the cargo that was sent along the cargo conveyor line 11 towards the cargo door 4 of the aircraft 3 is carried through the cargo loading/unloading door 4 to a designated position within the aircraft 3.

Structuring the loading bridge 1 for the transport of air cargo in this manner, makes it possible to eliminate the need for a large number of workers to drive ramp equipment tractors and to transfer the cargo to and from container/pallet loaders and self-propelled conveyor belts, and it additionally shortens the time required to load cargo into the aircraft 3. Further, since it eliminates the need for ramp equipment tractors to move about the airport, the invention provides an air cargo handling system that reduces costs such as for manpower, shortens cargo loading time, and reduces the danger of collisions on the tarmac. Also in the reversed operation when the cargo aboard the aircraft is to be transported into the airport terminal, the above described operations may be reversed to unload the cargo in a similar manner.

A loading bridge for the conveyance of air cargo according to the present invention was as described above, however, it would be possible to employ various types of cargo conveyor junctions 12 that differ from the embodiment shown in FIG. 5, for example, using a carrousel for conveying the passenger baggage, and etc. such as shown in FIGS. 6 and 7. In FIGS. 6 and 7, 10 and 11 represent the foregoing cargo conveyor lines and 12 represents the cargo conveyor junction, which employs round shaped carrousel plates 70 that move in a circular track. The carrousel plates 70 are linked and rotated by means of respective linkage bosses 71 that connect to a linkage pin 72 that holds a guide roller 74 guided by a guide rail 73. The carrousel plates 70 also have running wheels 75 supported on the conveyor frame 76, by legs 77, etc. to enable their smooth movement.

Thus, the carrousel plates 70 move in a circular pattern due to their respective guide rollers 74, attached to the linkage bosses 71, which follow the guide rail 73 atop the conveyor frame 76 that is supported by the legs 77 to thereby convey the cargo resting thereupon. Then, in order for the cargo resting on the carrousel plates 70 to be smoothly conveyed onto the cargo conveyor line 11, as shown in FIG. 8, the conveyor dips lower on the area nearest the cargo conveyer line 11 to thereby enable cargo coming from cargo conveyor line 10 onto the cargo conveyor junction 12 to be transported by the carrousel plates 70 and transferred to the top of the cargo conveyor line 11. The carrousel plates 70, which dip down as shown in FIG. 8, then return to their original height on the side opposite the cargo conveyor lines 10, 11. Structuring the cargo conveyor junction 12 in this manner, eliminates the need to have the conveyor unit 52 shown in the foregoing FIG. 5 and further eliminates the need to rotate the unit 52 for each piece of cargo, to thereby make it possible to continuously send the cargo. When the cargo is to be unloaded from the aircraft, the same sort of conveyance is possible by reversing the arrangement for the cargo conveyor lines 10 and 11 of FIG. 6.

As mentioned above, since the cargo holding area of the airport terminal connects to the loading door of aircraft via a plurality of cargo conveyor lines and the cargo conveyor junction that has a mechanism to rotate the transportation surface on the conveying line to change the direction of the cargo being transported, the need for human driven ramp equipment tractors or other equipment used in the prior arts may be eliminated. Thus not only does this invention prevent the possibility of accidents such as collisions, but it also reduces manpower costs, and shortens the time required to load cargo.

What is claimed is:

1. A loading bridge for conveying air cargo that connects an airport terminal with a cargo loading/unloading door of an aircraft, comprising:

a plurality of cargo conveyor lines, at least one of which is extendable and retractable; and a cargo conveyor junction that joins said plurality of cargo conveyor lines, which by rotating a conveying surface or by changing the angle of the surface, diverts the conveying direction of the cargo riding on said cargo conveyor line from one cargo conveyor line to a designated one of said plurality of cargo conveyor lines; wherein said cargo conveyor junction is round shaped, and comprises a carousel having a plurality of cargo loading carousel plates which move in a circular path, and said carousel receives cargo from said cargo conveyor line and places the cargo on said cargo loading carousel plates moving in a circular path, and forwards the cargo to the designated cargo conveyor line.

2. An air cargo conveying loading bridge according to claim 1, wherein said cargo conveyor junction comprises a transport unit having a cargo transport conveyor belt which is rotatable, and a control mechanism which can rotate said transport unit and stop said unit at a point at which said diverted conveying direction of said transport unit matches a conveying direction of said designated cargo conveyor line.

3. An air cargo conveying loading bridge according claim 1, wherein
one end of said loading bridge connects to the airport terminal and the other end reaches the cargo loading/unloading door of the aircraft to thereby enable the cargo to be transported from the airport terminal to the cargo loading/unloading door of the aircraft.

4. An air cargo conveying loading bridge for conveying air cargo that connects an airport terminal with a cargo loading/unloading door of an aircraft, comprising:
a plurality of cargo conveyor lines, at least one of which is extendable and retractable; and
a cargo conveyor junction that joins said plurality of cargo conveyor lines, which by rotating a conveying surface or by changing the angle of the surface, diverts the conveying direction of the cargo riding on said cargo conveyor line from one cargo conveyor line to a designated one of said plurality of cargo conveyor lines; wherein
said at least one extendable and retractable cargo conveyor comprises a central conveyor unit having a transport conveyor, and end conveyor units which are slidably joined to said central conveyor unit at each of its ends, and which includes a mechanism that maintains an approximately flat transport surface for the cargo between said end conveyor units and said central conveyor unit.

5. An air cargo conveying loading bridge according to claim 4, wherein
one end of said loading bridge connects to the airport terminal and the other end reaches the cargo loading/unloading door of the aircraft to thereby enable the cargo to be transported from the airport terminal to the cargo loading/unloading door of the aircraft.

6. A loading bridge for conveying air cargo that connects an airport terminal with a cargo loading/unloading door of an aircraft, comprising:
a plurality of cargo conveyor lines, at least one of which is extendable and retractable; and
a cargo conveyor junction that joins said plurality of cargo conveyor lines, which by rotating a conveying surface or by changing the angle of the surface, diverts the conveying direction of the cargo riding on said cargo conveyor line from one cargo conveyor line to a designated one of said plurality of cargo conveyor lines; wherein
said cargo conveyor junction is round shaped, and comprises a carousel having a plurality of cargo loading carousel plates which move in a circular path, and said carousel receives cargo from said cargo conveyor line and places the cargo on said loading carousel plates moving in a circular path, and forwards the cargo to the designated cargo conveyor line; and
said at least one extendable and retractable cargo conveyor line comprises a central conveyor unit having a transport conveyor, and end conveyor units which are slidably joined to said central conveyor unit at each of its ends, and which includes a mechanism that maintains an approximately flat transport surface for the cargo between said end conveyor units and said central conveyor unit.

* * * * *